United States Patent
Darmann et al.

(10) Patent No.: US 8,564,921 B2
(45) Date of Patent: Oct. 22, 2013

(54) FAULT CURRENT LIMITER WITH SHIELD AND ADJACENT CORES

(75) Inventors: Francis Anthony Darmann, Chatswood (AU); Franco Moriconi, Berkeley, CA (US); Eoin Patrick Hodge, Surry Hills (AU)

(73) Assignee: Zenergy Power Pty Ltd, Wollongong (AU)

( * ) Notice: Subject to any disclaimer, the term of this patent is extended or adjusted under 35 U.S.C. 154(b) by 130 days.

(21) Appl. No.: 13/020,323

(22) Filed: Feb. 3, 2011

(65) Prior Publication Data
US 2012/0200971 A1    Aug. 9, 2012

(51) Int. Cl.
*H02H 9/02* (2006.01)

(52) U.S. Cl.
USPC .......................................... 361/93.9

(58) Field of Classification Search
USPC .......................................... 361/93.9
See application file for complete search history.

(56) References Cited

U.S. PATENT DOCUMENTS

| | | |
|---|---|---|
| 4,045,823 A | 8/1977 | Parton |
| 4,117,524 A | 9/1978 | Parton et al. |
| 5,546,261 A * | 8/1996 | Yoshida et al. ............... 361/19 |
| 5,600,522 A * | 2/1997 | Hull ............................ 361/19 |
| 6,873,236 B2 * | 3/2005 | Shah et al. .................... 336/58 |
| 7,193,825 B2 * | 3/2007 | Darmann et al. .............. 361/19 |
| 7,283,339 B2 * | 10/2007 | Tekletsadik .................. 361/19 |

FOREIGN PATENT DOCUMENTS

| | | |
|---|---|---|
| WO | 2004/068670 | 8/2004 |
| WO | 2009/121143 | 10/2009 |

OTHER PUBLICATIONS

Raju et al., "Fault-Current Limiter with Superconducting DC Bias", IEE Proc., vol. 129, Pt. C. No. 4, Jul. 1982, pp. 166-171.

* cited by examiner

*Primary Examiner* — Jared Fureman
*Assistant Examiner* — Kevin J Comber
(74) *Attorney, Agent, or Firm* — Fay Kaplun & Marcin, LLP

(57) ABSTRACT

In a fault current limiter (FCL) of a saturated core type having at least one coil wound around a high permeability material, a method of suppressing the time derivative of the fault current at the zero current point includes the following step: utilizing an electromagnetic screen or shield around the AC coil to suppress the time derivative current levels during zero current conditions.

18 Claims, 13 Drawing Sheets

FAULT CURRENT LIMITER WITH SHIELD AND ADJACENT CORES

GOVERNMENT RIGHTS

The United States Government has certain rights in the invention pursuant to a contract with the U.S. Department of Energy.

FIELD OF THE INVENTION

The invention generally relates to the field of fault current limiters. In particular, the present invention relates to fault current limiters of the high permeability saturated core type. The present invention discloses improved methods of construction of such fault current limiters.

BACKGROUND OF THE INVENTION

Any discussion of the prior art throughout the specification should in no way be considered as an admission that such prior art is widely known or forms part of common general knowledge in the field.

Saturated core fault current limiters are known. For example, U.S. Pat. Nos. 7,193,825 and 4,045,823 disclose fault current limiters where a core is magnetically saturated during normal operation by a DC current and taken out of magnetic saturation during a fault condition. The saturated core fault current limiter relies upon the non-linear properties of high permeability saturation/de-saturation so as to suppress faults.

Unfortunately, a number of unwanted operational characteristics of such a fault current limiters are usually present during a fault condition. These can include excessive electromagnetic forces and/or fluxes which can occur during faults which provide excessive mechanical and electromagnetic stresses on the fault current limiter. Additionally, the magnetic fluxes generated can be coupled to any DC coil which is designed to normally saturate the core. The coupling can affect the ongoing saturation and limit the effectiveness of the fault current limiter.

These and other unwanted effects can occur with prior art fault current limiter devices.

SUMMARY OF THE INVENTION

The present invention relates to an improved form of fault current limiter device of the magnetically saturated core type.

In accordance with a first exemplary aspect of the present invention, there is provided in a fault current limiter (FCL) of a saturated high permeability core type having at least one coil wound around a high permeability material, a method of suppressing the current waveform time differential at a zero current condition, the method including the step of: utilizing an electromagnetic screen or shield around the coil to suppress voltage levels during zero current conditions.

The fault current limiter preferably can include a first and second high permeability columns; first phase coil wound around the first high permeability column; second phase coil wound around the second high permeability column; high permeability saturation unit surrounding the first and second high permeability columns for substantially magnetically saturating the columns during non fault operation, and wherein the electromagnetic screen or shield can be formed around the first and second phase coils.

In accordance with a further aspect of the present invention, there is provided a fault current limiter including, at least: first and second high permeability columns; first phase coil wound around the first high permeability column; second phase coil wound around the second high permeability column; high permeability saturation unit surrounding the first and second high permeability columns for substantially magnetically saturating the columns during non fault operation; wherein the phase coils are arranged substantially adjacent and parallel to one another.

The first and second phase coils are preferably wound around respective columns with an opposite helix pattern. The phase coil and corresponding high permeability column are preferably substantially concentric. The first and second high permeability columns can include a cross section having an elongated segment with the elongated segments being arranged in a substantially opposed manner.

In preferred embodiments the electromagnetic conductive shield substantially encapsulates the phase coils. The electromagnetic conductive shield can be formed from a metallic material. In preferred embodiments, the first and second phase coils are preferably aligned and have their mid points in a common plane. The first and second phase coils are preferably adjacent one another and wound in an opposite sense.

In accordance with a further aspect of the present invention, there is provided in a fault current limiter of a saturated high permeability core type having at least one coil wound around a high permeability material, a method of suppressing the voltage differential during a zero current condition, the method including the step of: utilising an electromagnetic screen or shield around the coil to suppress di/dt levels during zero current conditions.

The screen or shield can be placed between the phase coils and the magnetic saturation unit so as to reduce the AC flux in the vicinity of the magnetic saturation unit. The electromagnetic shield can be separate from the structure or the dielectric system of the FCL. In some arrangements, the electromagnetic shield can be integral to the structure or dielectric system of the FCL. In other arrangements, the electromagnetic shield can be incorporated into an otherwise non-magnetic or non-conductive material or structure, such as a composite tank comprising either the mechanical structure and/or part of the dielectric system of a FCL. In other arrangements, the electromagnetic shield can be separate from an otherwise non-magnetic or non-conductive material or structure, such as a composite tank comprising either the mechanical structure and/or part of the dielectric system of a FCL.

BRIEF DESCRIPTION OF THE DRAWINGS

Notwithstanding any other forms which may fall within the scope of the present invention, preferred forms of the invention will now be described, by way of example only, with reference to the accompanying drawings in which.

DETAILED DESCRIPTION OF THE INVENTION

In the preferred embodiments of the present invention there is provided an improved form of fault current limiter.

The construction and development of fault current limiter (FCL) devices has led to a number of advances in their construction.

In particular, significant advantages in saturated-core FCL designs in which the electrical half-phases are located adjacent to and in opposition to each other result in practical, effective and efficient designs. Further, the incorporation of an electromagnetic conductive shield around the half phases has been found to lead to suppression in the di/dt level in the FCL during zero current crossings in an alternating current environment. Discussion of these effects follows.

Figure 1:
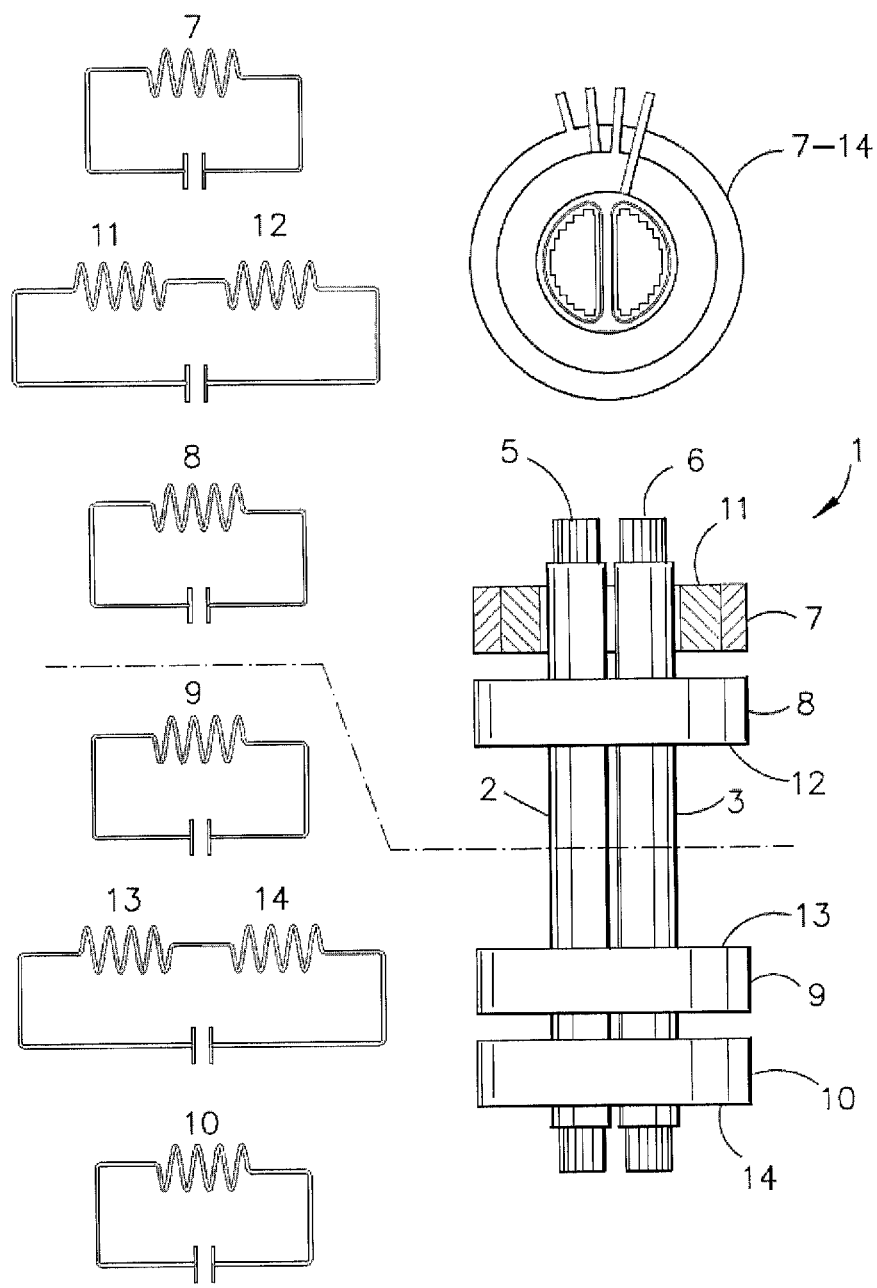
FIG. 1 illustrates a first saturated core FCL arrangement with the DC bias circuit.

Initially, a first constructed arrangement is illustrated schematically 1 in FIG. 1, with two electrical half phases 2, 3 wound around a corresponding laminated high permeability cores 5, 6. DC biasing coils 7-14, which, for want of convenience, were constructed using copper conductor in the prototype, were provided to bias the core into saturation during normal non fault conditions.

Figure 2:
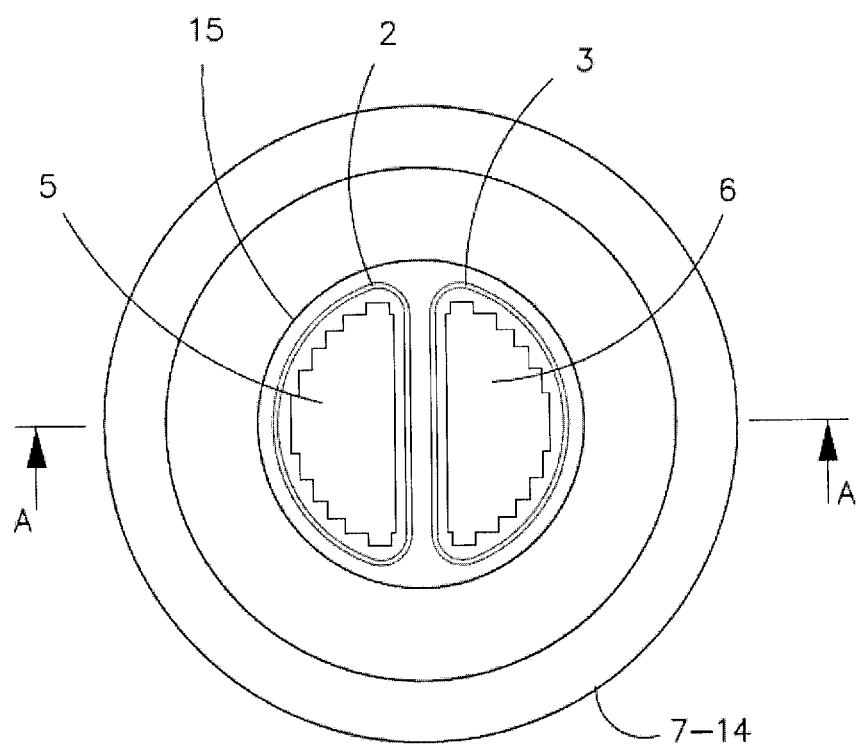
FIG. 2 illustrates a sectional view through the arrangement of FIG. 1.

In such designs, the mid-points of the AC coils 2,3 and iron cores 5,6 are all located in the same plane, and the AC coils and iron cores are arranged as tightly and compactly as possible consistent with electrostatic clearance requirements for the chosen dielectric scheme. As shown in FIG. 2, such arrangements include, but are not limited to, two AC coils 2, 3 with concentric high permeability material cores 5, 6 with "D-shaped" cross-sections arranged with the flats of the "D" shaped cores adjacent and parallel to each other so as to fit both AC coils and cores within a cylinder 15 for a single-phase device.

Figure 3:
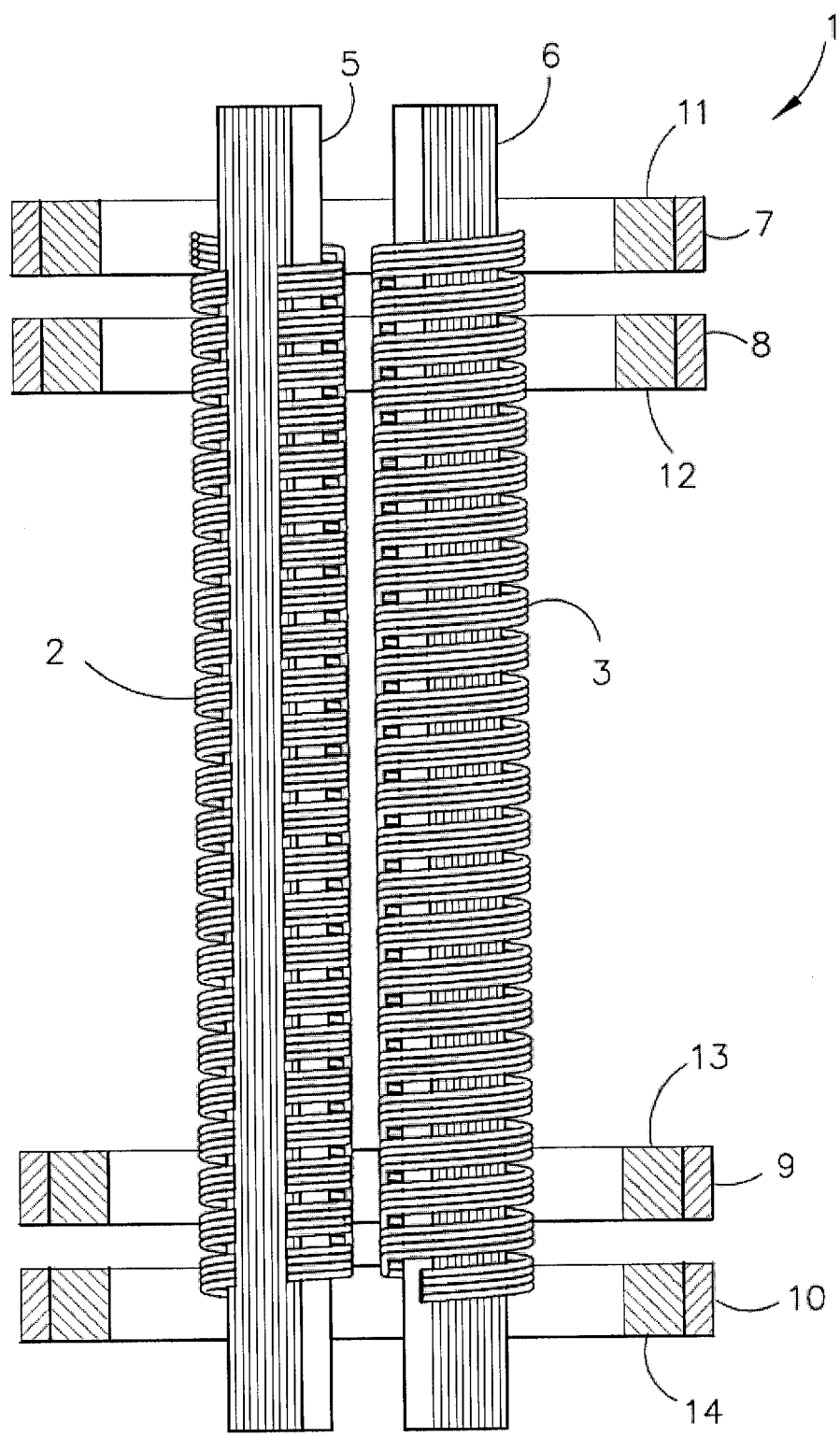
FIG. 3 illustrates a cut away view of portions of an FCL of FIG. 1.

FIG. 3 illustrates a cut away view of the arrangement of FIG. 1 illustrating the four DC coils 7-14 around two laminated high permeability steel columns 5,6 around which are wound two AC phase coils 2, 3 which are connected electrically in series.

In a corresponding three phase system, six "kite-shaped" or "pie-shaped" AC coils can be provided around concentric high permeability material cores arranged radially with their points together and parallel to a central axis, with respective half-phases opposite each other, so as to fit compactly within a cylinder for a three-phase device.

Such arrangements and other potential similar arrangements were considered to be electromagnetically balanced in that the flux density in the high permeability cores from the fault currents were found to counteract each other in the aggregate and largely cancel each other when the resulting FCL is viewed as a whole, yet the flux density resulting from the fault currents in each AC coil of a phase act individually on their respective high permeability cores and effectively limit the fault current in each half cycle of the fault current.

The advantages of this design include, but are not limited to: greatly reduced electromechanical forces which must be accounted for in the mechanical and electrical design of the FCL, greatly reduced coupling between the AC coils and the DC saturation magnet coils in the FCL, much lower voltages induced on the DC saturation magnet coils during fault conditions, and much lower AC fluxes at the periphery of the AC coils and high permeability material cores which reduces the AC losses and resulting heat load within the DC saturation magnet coils.

It was therefore initially found to be advantageous to provide for electrical half-phases that are adjacent to each other and in opposite orientation. Of course, other arrangements are possible with consequential variations in efficiency.

Additional advantages were also incorporated. In use of an FCL in an electrical distribution system, circuit breaker design and rating considerations require that the AC fault current that can be reliably and safely interrupted by a circuit breaker be characterized by a peak fault current and a maximum value of the di/dt or time rate of change of the current at the zero-crossing of the fault current. If an FCL provides for the reduction of the fault current peak, but the resulting di/dt at the zero-crossing of the fault current waveform is not reduced accordingly, then the ability of the circuit breaker to interrupt the resulting reduced or limited fault current in an electrical distribution system is compromised, and the circuit breaker must be de-rated electrically. Restated, if the relationship between the limited peak fault current and the di/dt of the limited peak fault current at the zero-crossing of the fault current does not meet certain parameters, regulation authorities may deem that the limited peak fault current may not be used as the design value for determining whether or not a circuit breaker with a particular peak current interrupt rating can operate safely.

For example, assuming that a particular circuit has a peak fault current of 50 kA, but is equipped with a circuit breaker that has an interrupt rating of 40 kA, and that a fault current limiter is to be installed to limit the peak fault current to 39 kA, which should be below the rated interrupt rating of the existing circuit breaker. Unless the di/dt of the 39 kA limited peak fault current is reduced appropriately from the di/dt of the peak unlimited 50 kA fault current, the 39 kA limited peak fault current may not be within the safe interrupt rating of the existing circuit breaker, and depending on the actual di/dt value of the limited peak fault current it may be necessary to limit the peak fault current to sum other value, such as 35 kA, in order ensure safe interruption. This is referred to as "de-rating" the existing circuit breaker.

Investigations by the present inventors have revealed that the utilization of a conductive electromagnetic shield around the coils in a saturated-core FCL design acts to reduce the di/dt value at a zero current crossing. Normally, in prior art arrangements, the di/dt of the limited peak fault current will not change or may even increase as the peak fault current is reduced, which will require "de-rating" of any circuit breakers in the associated electrical circuit. Extensive testing has also shown that if a conductive electromagnetic shield is employed in a saturated-core FCL with the adjacent and oppositely oriented architecture described above, the performance of the saturated-core FCL is improved.

Testing has demonstrated that the electromagnetic shield can be a conductive, but non-magnetic structure or tank that can also be integral to the mechanical structure of the saturated-core FCL or the dielectric system of the FCL.

Similarly, composite or other non-conductive FCL structures or dielectric system components will not provide the same degree of beneficial reduction of the di/dt of the limited peak fault current at the zero crossing and result in a saturated-core FCL that is non-optimal or requires de-rating of the associated circuit breakers.

Figure 4:
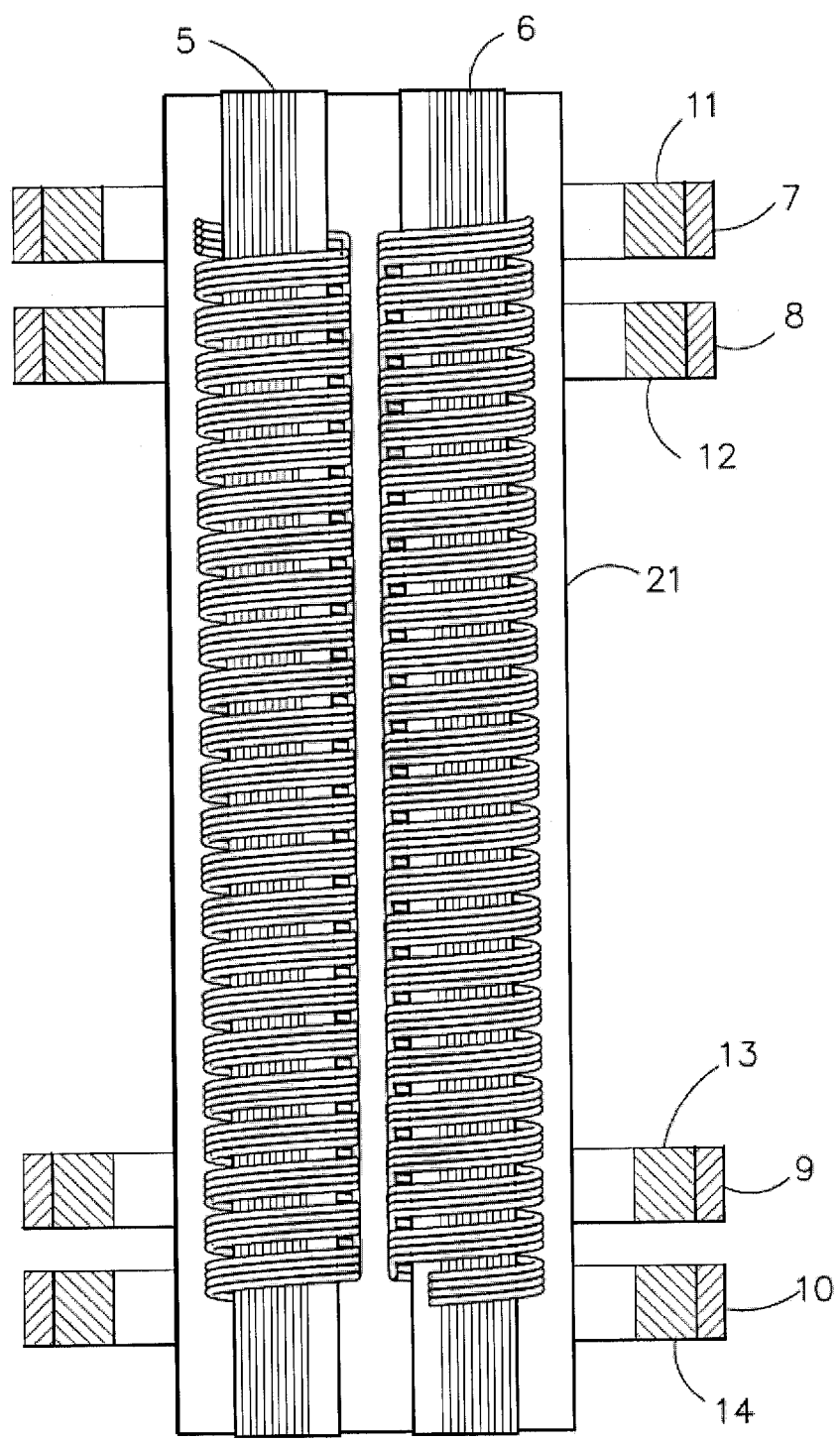
FIG. 4 is a sectional view illustrating the utilization of a shield around the phase coils of an FCL.

FIG. 4 illustrates the placement of an electromagnetic shield 21 around the arrangement of FIG. 3. Different forms of shields were found to be effective. In examples tested, both 9 mm thick 316 stainless steel shielding and 0.9 mm thick electrical grade copper shielding were found to be effective.

Characterisation of the FCL with and without each shield under the same experimental conditions was undertaken. FIG. 5 to FIG. 12 illustrates the results of one such characterization of the operation of an FCL under fault current conditions.

Figure 5:
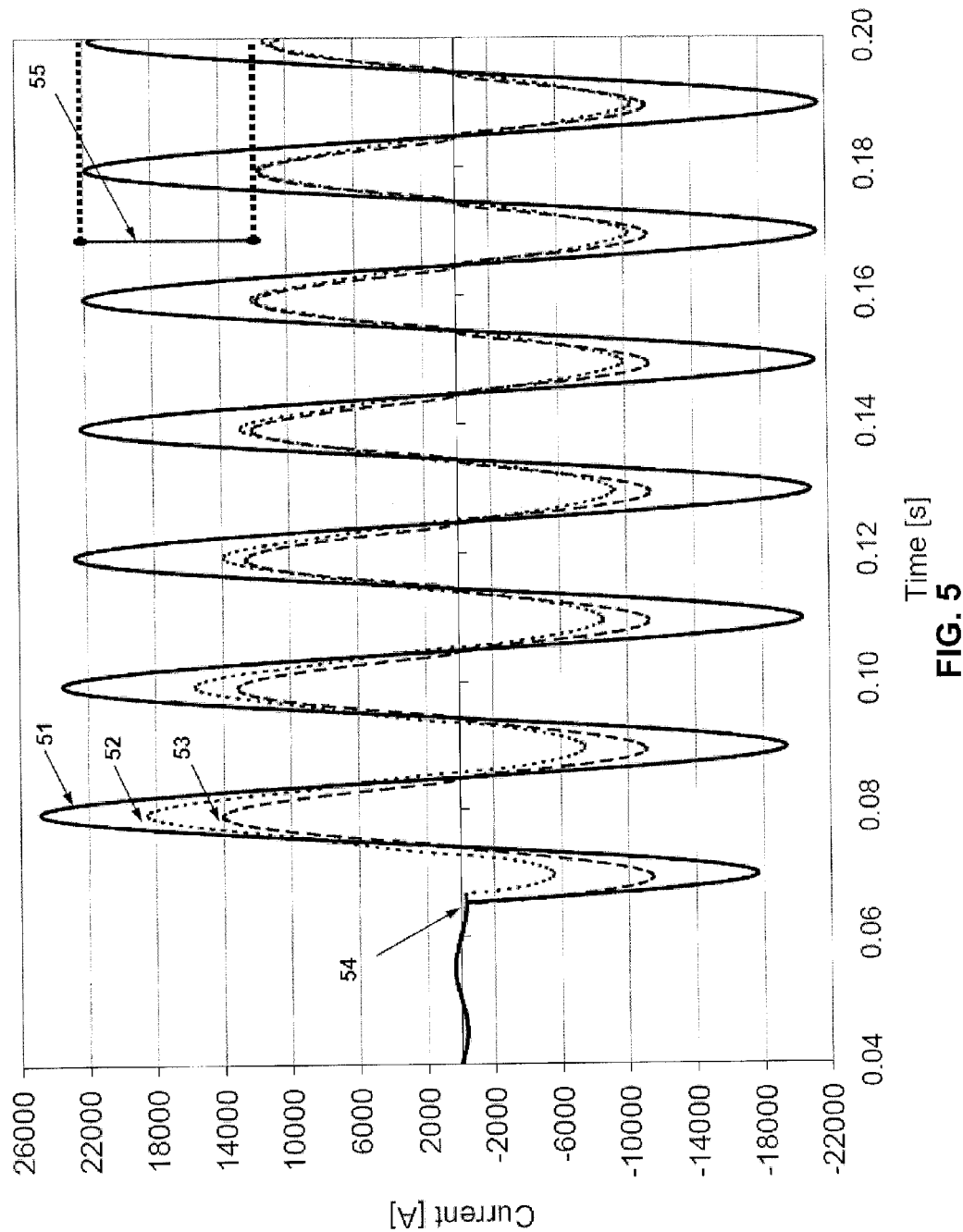
FIG. 5 illustrates a graph of example fault responses for a non shielded and shielded FCL.

In FIG. 5, there is illustrated the results of a fault simulation for various input designs. The details of this FCL are shown in Table 1:

TABLE 1

| Parameter | Abbreviation | Unit | Value |
| --- | --- | --- | --- |
| Source voltage | $V_s$ | kV | 1.5 |
| Prospective fault current | If | kA | 15 |
| Limited fault current | If | kA | 8.2 |
| Cross sectional area of each high permeability core post | $A_{CORE}$ | m² | 0.038 |
| Height of the steel cores | $H_{CORE}$ | m | 1.800 |
| Number of AC turns on each high permeability core post | $N_{AC}$ |  | 23 |
| Height of AC coils | $H_{AC}$ | m | 1.457 |
| Copper conductor employed to construct AC coils |  | mm | 14 × 4 |
| DC Bias applied to FCL | $NI_{DC}$ | kAT | 230 |
| Number of DC coil turns in total | $N_{DC}$ |  | 784 |
| Copper conductor employed to construct DC coils |  | mm | 14 × 4 |
| Shield height | $H_{Shield}$ | m | 1,650 |
| Stainless steel shield thickness | $t_{SS}$ | mm | 9 |
| Copper shield thickness | $t_{Cu}$ | mm | 0.9 mm |

A 15 kA RMS steady state prospective fault current (24K kA peak fault) is simulated to occur at the point 50. The measured prospective fault current is obtained by taking the Fault current limiter out of the test circuit, causing a fault, and collecting the data, which is subsequently plotted 51. The curve 52 illustrates the measured reduced fault current with a fault current limiter of the design such as that indicated in FIG. 1. The curve 53 illustrates the resulting fault current when an electromagnetic shield is incorporated into the FCL design such as that illustrated in FIG. 4. It can be seen that there has been a substantial reduction 55 in the level of steady state fault current, from approximately 15 kA RMS to 7.35 kA RMS. In addition, the first peak in the prospective fault current waveform 51 has been reduced from a value of 24 kA to 14 kA when the electromagnetic shield is included 53. When the electromagnetic shield is not included, the first peak was observed to be only reduced to 18 kA. It will be appreciated by those skilled in the art that reductions in the first peak in the fault current waveform has advantages for easing the maximum mechanical forces on electrical equipment subjected to the fault current.

Figure 6:
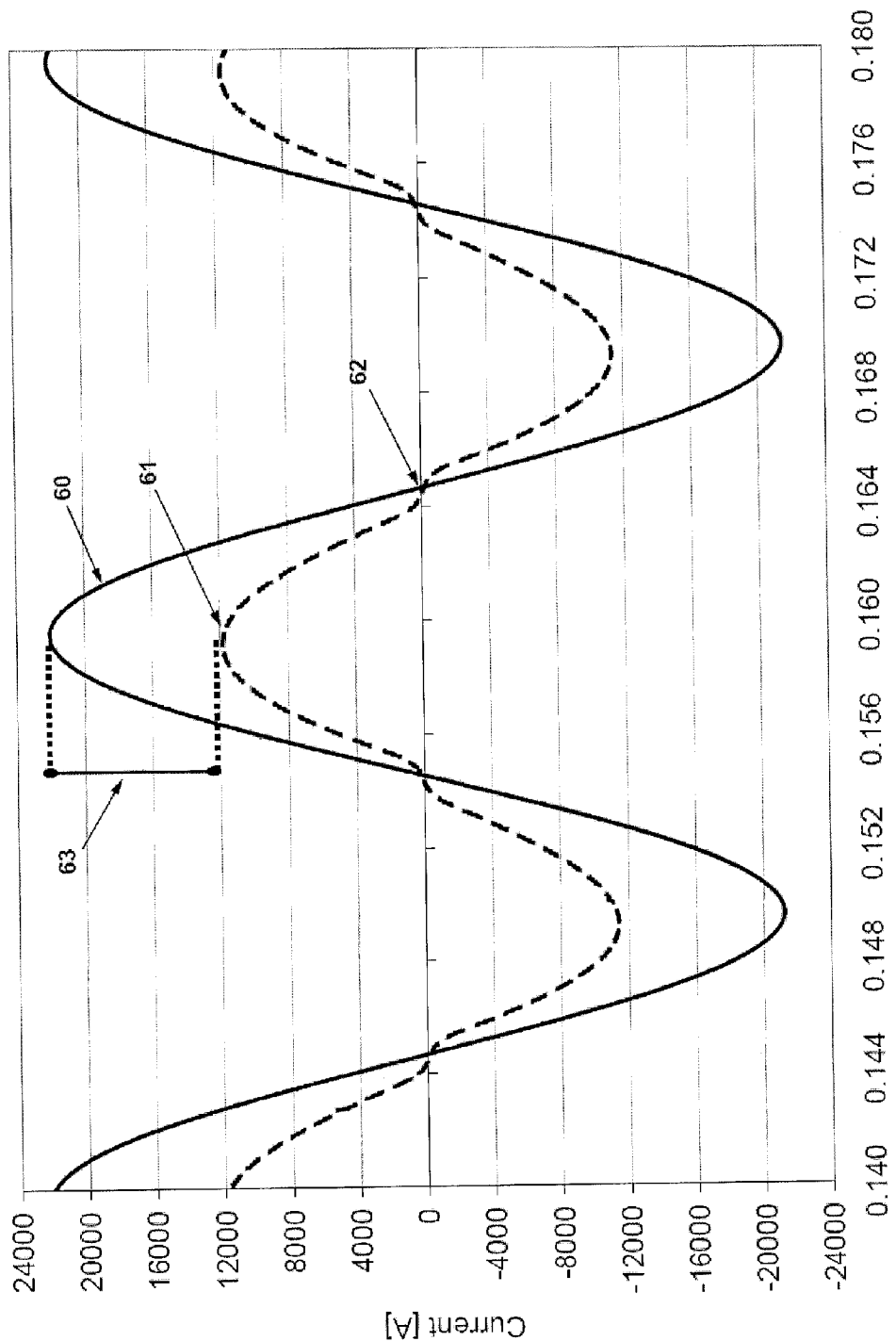
FIG. 6 is a graph illustrating the fault current limiting behaviour of a shielded FCL.

FIG. 6 illustrates a portion of the steady state fault current in more detail for the no FCL and shielded FCL case. The fault current was measured for the same 15 kA RMS steady state prospective fault current test circuit, with the curve 60 illustrating the fault current without a FCL and the curve 61 illustrating the fault current with the shielded FCL in circuit, indicating the substantial reduction in fault current and that the fault current reduction in the steady state is maintained despite the presence of the shield. Interestingly, a significant anomaly occurred in the shielded case at the zero crossing point 62.

Figure 7:
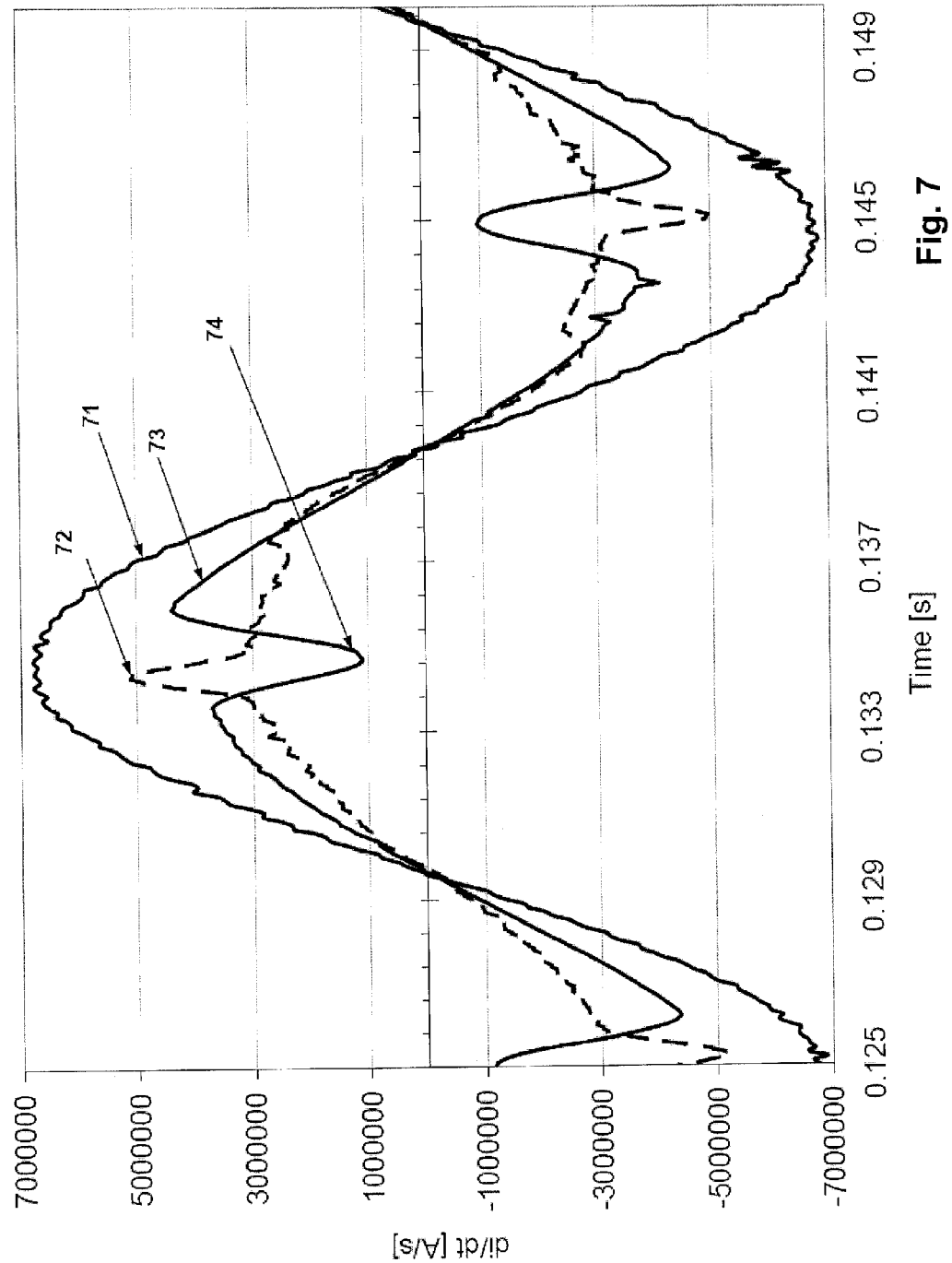
FIG. 7 is a graph illustrating the time derivative of the fault current behaviour of a shielded FCL compared to a non-shielded FCL.

Corresponding di/dt measurements of FIG. 6 were also taken and are illustrated in FIG. 7. FIG. 7 illustrates the results of such measurements. The curve 71 illustrates the di/dt waveform without the FCL in the test circuit. The curve 72 represents the measured di/dt current waveform with an unshielded FCL arrangement in the test circuit. The curve 73 represents the di/dt current waveform with a 9 mm stainless steel shield incorporated into the FCL. The corresponding zero crossing point of the current occurs on the time axis at the point 74. It can be seen that the utilization of the shield substantially reduces the di/dt value 73 at the zero current crossing point 74 in comparison to the non shielded FCL case 72.

Without wishing to be bound by theory, the induced transformer current in the shield acts to suppress the di/dt at the current zero crossing.

Figure 8:
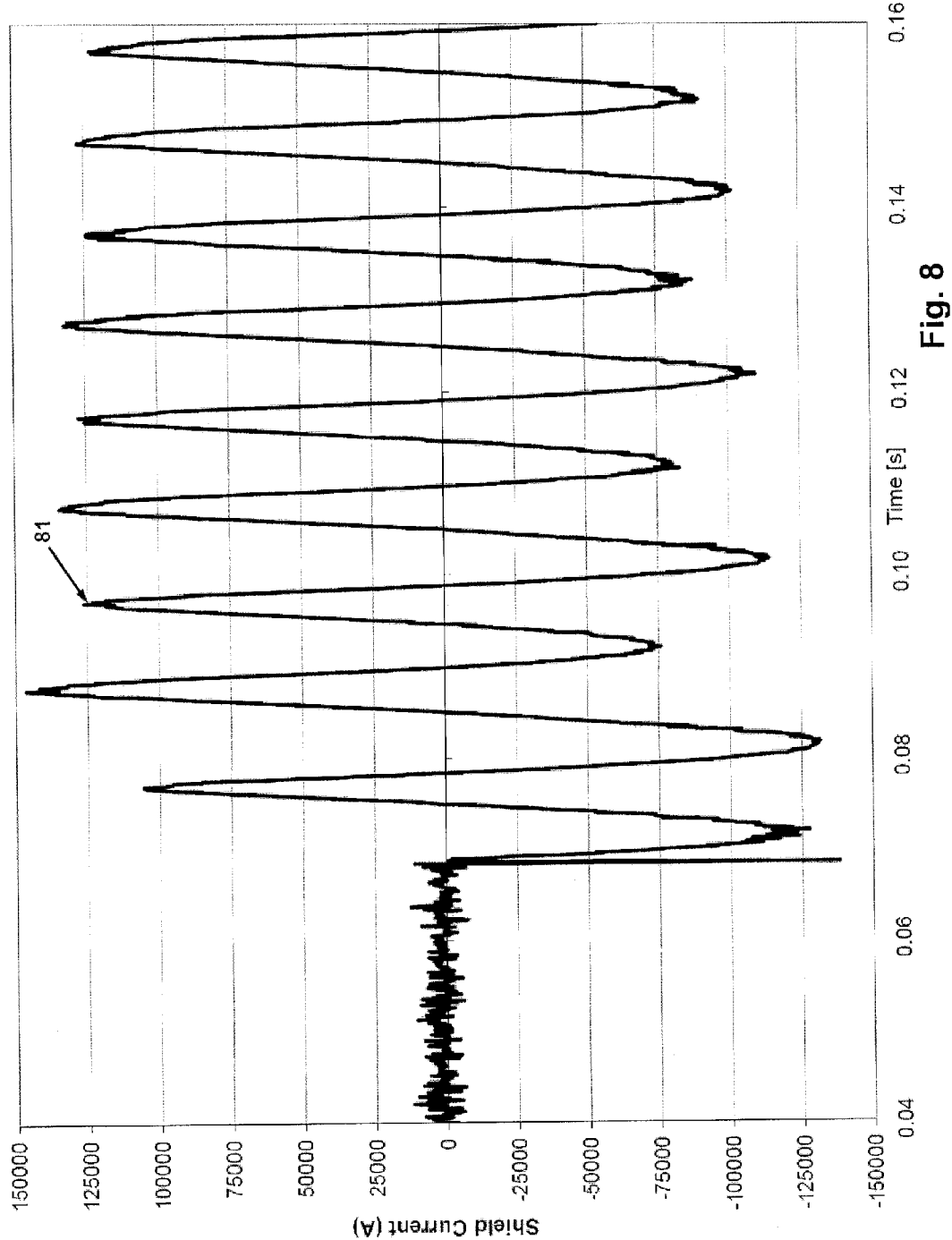
FIG. 8 illustrates the induced transformer current within a FCL shield during a fault.
Figure 9:
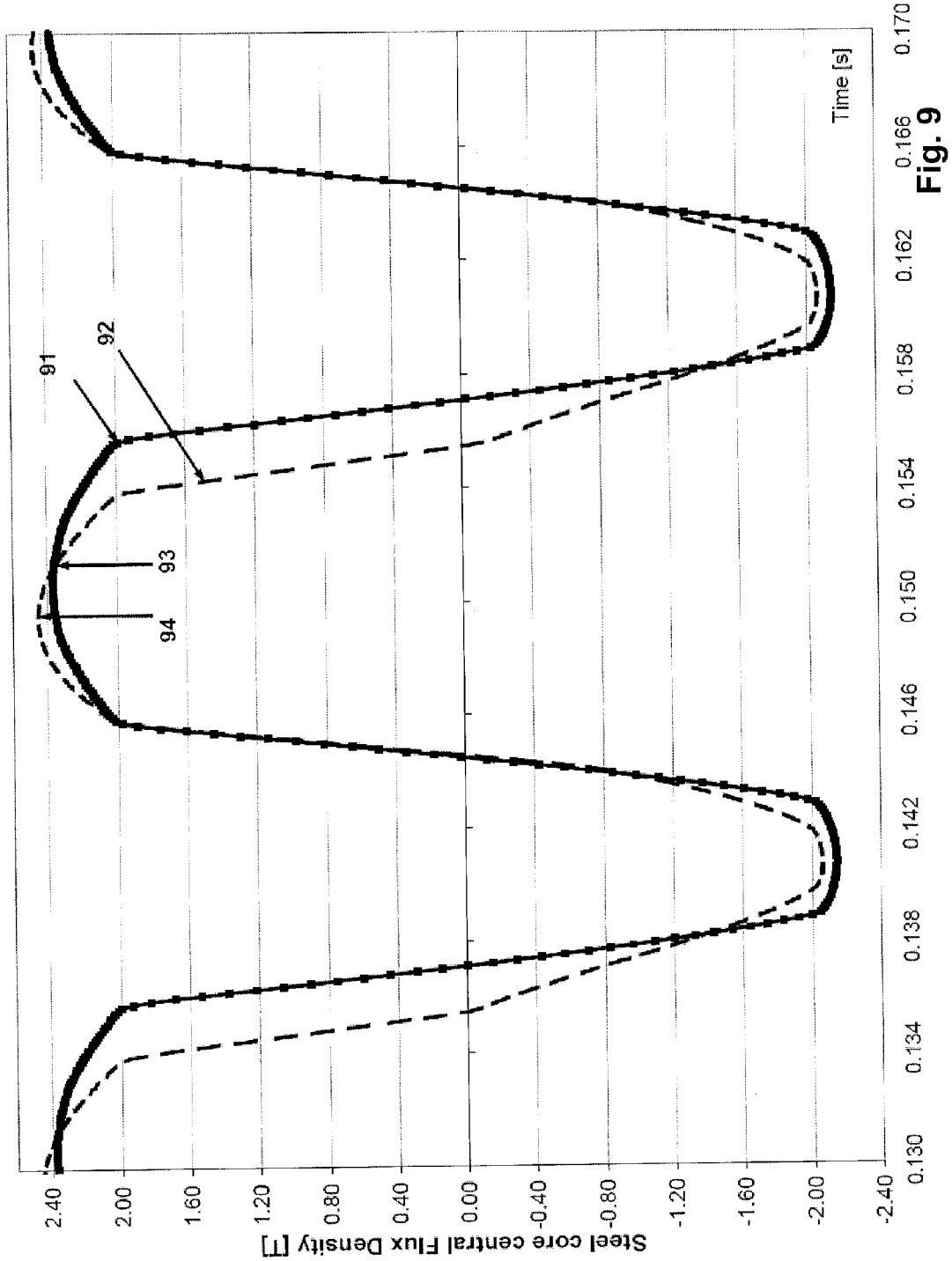
FIG. 9 details the magnetic flux density waveform in the centre of one of the high permeability cores during the fault with and without the FCL electromagnetic shield present.

FIG. 8 details the measured transformer current 81 induced in to the shield during the fault current event. FIG. 9 details the magnetic flux density waveform in the centre of one of the high permeability cores during the fault when the FCL has no shield present 91 and when a 9 mm thick stainless steel shield is present 92. As can be appreciated, the timing of the peak in the flux density has changed from 93 to 94 and shifted by 2 milliseconds. The complete flux waveform has also changed in shape between the case when the shield is not present 91 and when the shield is present 92.

Figure 10:
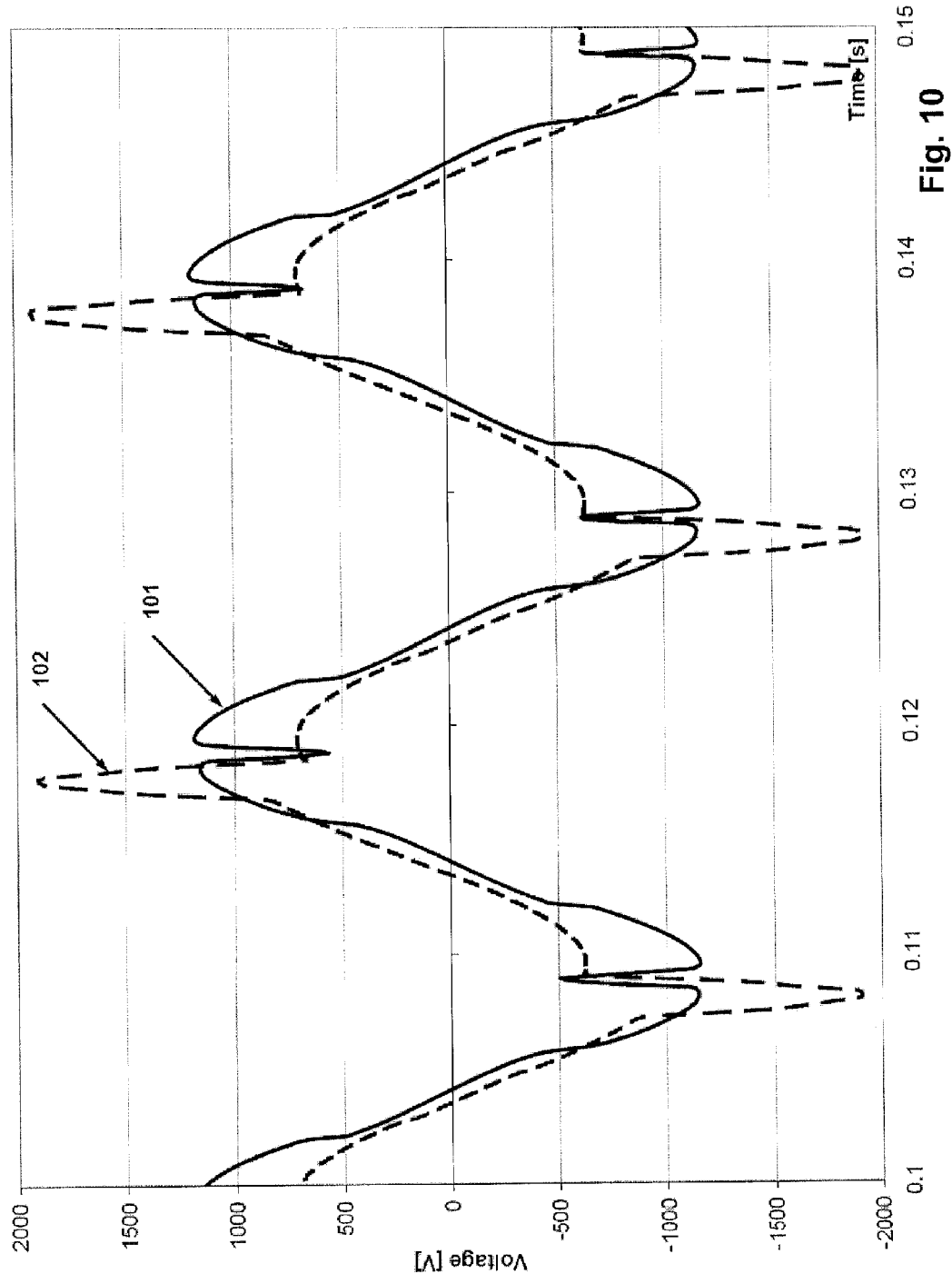
FIG. 10 shows the measured voltage induced across the terminals of the fault current limiter with and without the electromagnetic shield present.

The induced shielding current and altered flux density waveform in the high permeability cores has a number of beneficial effects on the detailed operation of the fault current limiter. FIG. 10 shows the measured voltage induced across the terminals of the fault current limiter when the shield is not present 101 and when the shield is present 102 on the fault current limiter. It should be understood that FIG. 10 displays the total measured voltage waveform across both AC coils in series of the fault current limiter.

Those skilled in the art will recognize that the saturated core fault current limiter functionality originates from the voltage that is induced across the AC coils during the fault. The measurements of these transient voltage curves during the fault without the shielding present 101 and with the shielding present 102 show that the details of the mechanism of fault current limiting is significantly effected by the shield. In particular, the shape of the induced voltage across the FCL device terminals is different and instead of the fault current limiter terminal voltage having a shape with a dip in it 101 it has a larger peak 102.

It will be appreciated by those skilled in the art that each of the measured waveforms consists of the sum of the transient voltage waveforms across the two series AC coils of the fault current limiter device and these can and were measured individually. These individual AC coil waveforms are shown in FIG. 11 and FIG. 12 respectively.

Figure 11:
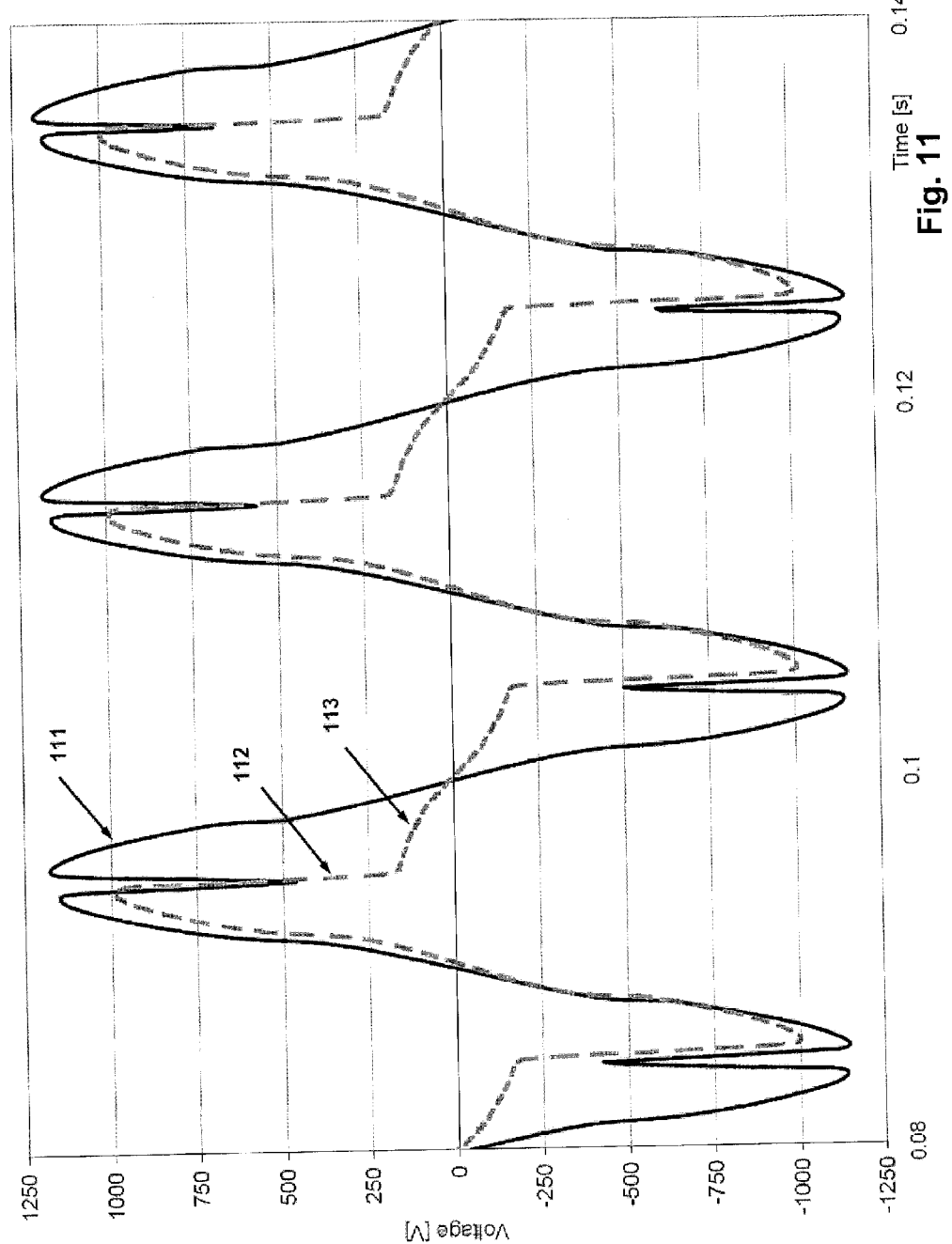
FIG. 11 details the measured voltage induced across the FCL device terminals and an individual AC phase coil of the FCL when the electromagnetic shielding is not present.

FIG. 11 details the waveforms of the voltage induced across the FCL device terminals when the shielding is not present 111 and the voltage across an individual AC coil of the fault current limiter when the shielding is not present 112. To add perspective and understanding, a portion of the curve 112 is labeled 113 and this represents the air core induced voltage effect into a single AC coil, and also for the case when the shielding is not present. This part of the AC coil transient voltage waveform is induced into the individual AC coil when the high permeability core saturates further into the high magnetic field region. This part of the AC coil induced waveform would be obtained even if there were no steel core and represents the effect of the air core reactance of the fault current limiter. As can be appreciated, it is substantially sinusoidal in nature as it should be for an air core reactor response.

Figure 12:
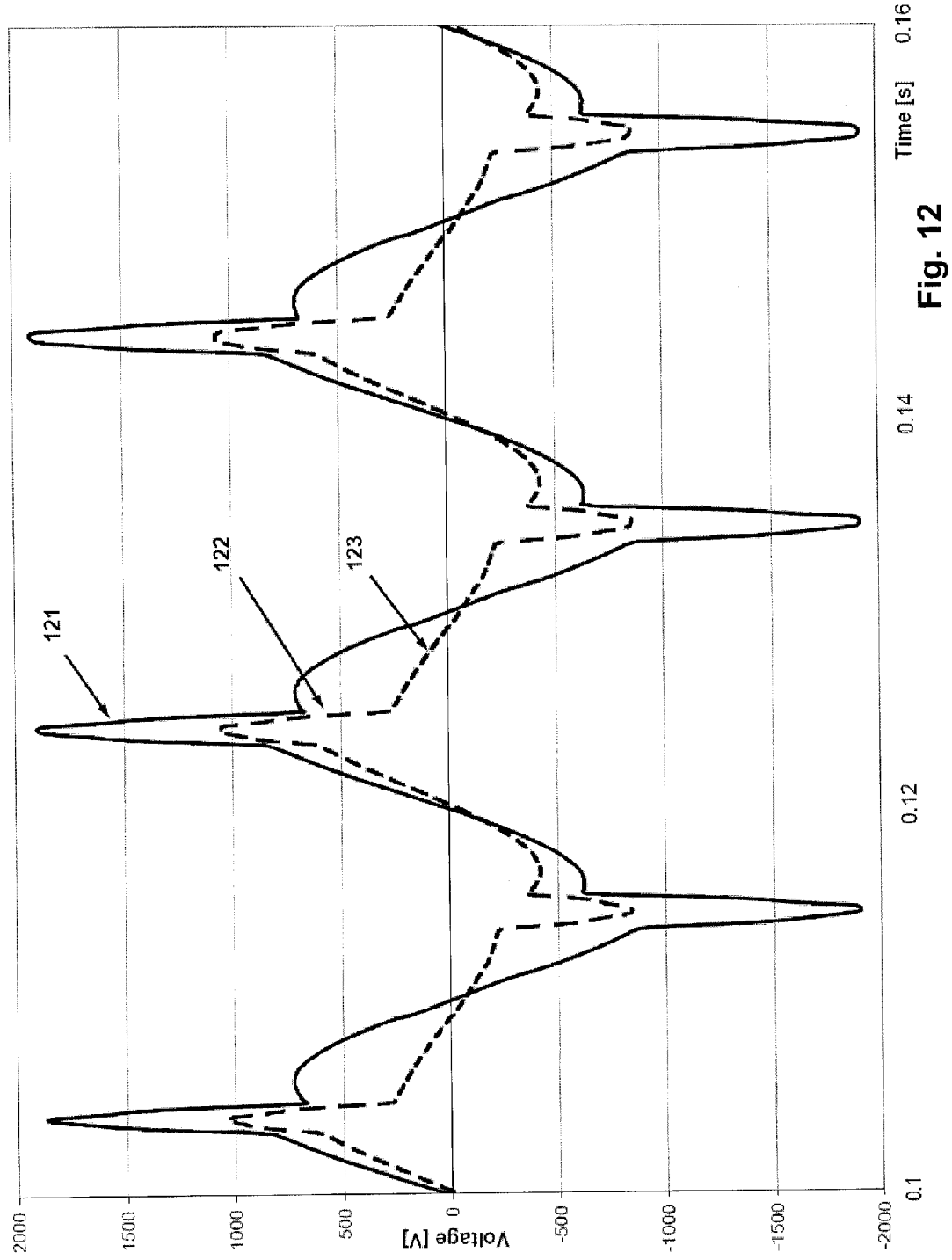
FIG. 12 details the waveforms of the transient voltage induced across the FCL device terminals and an individual AC phase coil of the FCL when the electromagnetic shielding is present.

FIG. 12 details the waveforms of the transient voltage induced across the FCL device terminals when the electromagnetic shielding is present 121 and the voltage across an individual AC coil of the fault current limiter, also when the electromagnetic shield is present 122. The portion of the individual AC coil voltage that is induced by the air core effect of the AC coil is also shown, 123.

The detailed measured AC coil transient voltages with and without a shield show that the presence of a well designed electromagnetic shield has significantly altered the characteristics of the induced voltage transients in the AC coils and consequently across the FCL terminals. The shield has eliminated the characteristic dip in the fault current limiter terminal voltage waveform 101 (FIG. 10), 111 (FIG. 11), and replaced it with a larger peak of induced voltage 121 (FIG. 12). The individual AC coil voltage transient waveforms across each individual AC coil are now in phase with each other when the electromagnetic shield is present and this is directly caused by the transformer current induced in the shield 81 and the subsequent alteration of the flux density transient waveform in the high permeability core 92 that results from this design.

Figure 13:
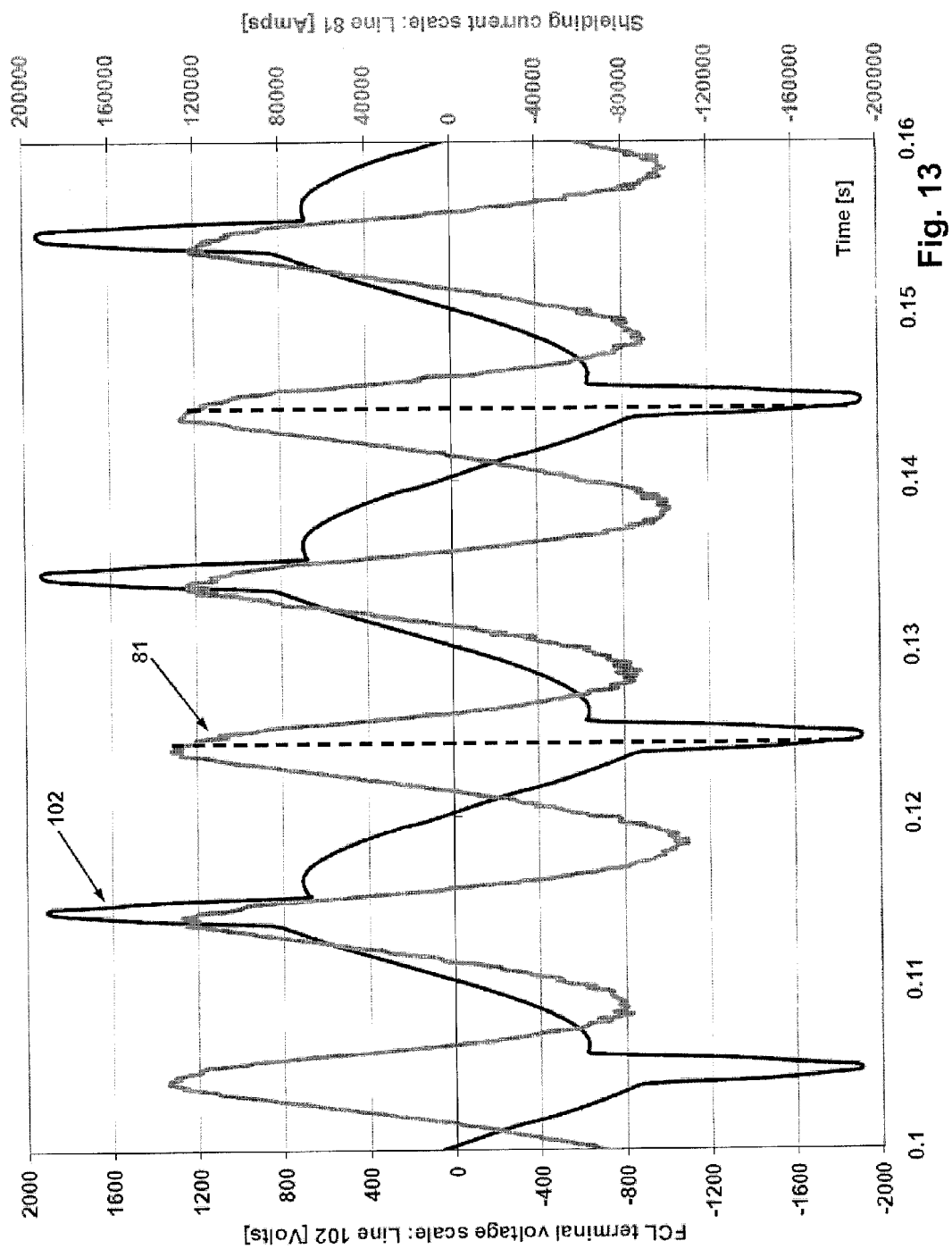
FIG. 13 illustrates the FCL terminal voltage waveform superimposed with the induced transformer current waveform in the shield during the fault with a shield present.

In order to facilitate the insight into the mechanism of the di/dt suppression at the current zero crossing, FIG. 13 details the FCL terminal voltage waveform during the fault with a screen present 102 and the screen induced transformer current 81 for the 9 mm thick stainless steel screen case. It can be appreciated that the transformer current in the screen has peaks which are in phase with the peak of the FCL terminal voltage waveform. FIG. 13 shows further evidence that the peaks in the shield transformer current which phase shifts each of the individual AC coil voltage waveforms 122 which in turn produces one larger voltage waveform peak 102 across the FCL.

Interpretation

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, Fig., or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact or that two or more elements are not in direct contact with each other but yet still co-operate or interact with each other.

Although the present invention has been described with particular reference to certain preferred embodiments thereof, variations and modifications of the present invention can be effected within the spirit and scope of the following claims.

We claim:
1. In a fault current limiter (FCL) of a saturated high permeability core type having at least one phase coil wound around a high permeability material, a method of suppressing a voltage differential during a fault zero current condition, comprising:
    utilizing one of an electromagnetic screen or an electromagnetic shield around the phase coil to suppress a time derivative of current waveform levels during zero current conditions.

2. The method of claim 1, wherein the fault current limiter includes
- first and second high permeability columns;
- first phase coil wound around the first high permeability column;
- second phase coil wound around the second high permeability column; and
- high permeability saturation unit surrounding the first and second high permeability columns for substantially saturating the columns during non fault operation, and
- wherein the electromagnetic screen or shield is formed around the first and second phase coils.

3. The method as claimed in claim 2, wherein the screen or shield is placed between the phase coils and the magnetic saturation unit so as to reduce the AC flux in the vicinity of the magnetic saturation unit.

4. The method as claimed in claim 2, wherein the electromagnetic shield is separate from the structure or any dielectric system of the FCL.

5. The method as claimed in claim 2, wherein the electromagnetic shield is integral to the structure or dielectric system of the FCL.

6. The method as claimed in claim 2, wherein the electromagnetic shield is incorporated into an otherwise non-magnetic or non-conductive material or structure.

7. The method as claimed in claim 2, wherein the electromagnetic shield is incorporated into a composite tank including at least one of the mechanical structure and part of the dielectric system of a FCL.

8. The method as claimed in claim 2, wherein the electromagnetic shield is separate from an otherwise non-magnetic or non-conductive material or structure.

9. The method as claimed in claim 2, wherein the electromagnetic shield is separate from a composite tank including at least one of the mechanical structure and part of the dielectric system of a FCL.

10. The method as claimed in claim 1, wherein the electromagnetic shield suppresses a first transient peak in the fault current waveform during a fault condition.

11. A fault current limiter, comprising:
- first and second high permeability columns;
- first phase coil wound around the second high permeability column;
- an electrically conductive shield substantially encapsulating the phase coils; and
- magnetic saturation unit surrounding the first and second high permeability columns for substantially saturating the columns during non fault operation,
- wherein the phase coils and the permeability columns are arranged substantially adjacent and parallel to one another.

12. The limiter of claim 11, wherein the first and second phase coils are wound around respective columns with an opposite helix pattern.

13. The limiter of claim 11, wherein the phase coil and corresponding high permeability column are substantially concentric.

14. The limiter of claim 11, wherein the first and second high permeability columns include a cross section having an elongated segment with said elongated segments being arranged in a substantially opposed manner.

15. The limiter of claim 11, wherein the electrically conductive shield is formed from a metallic material.

16. The limiter of claim 11, wherein the first and second phase coils are aligned and have their mid points in a common plane.

17. The limiter of claim 11, wherein the first and second phase coils are adjacent one another and wound in an opposite sense.

18. In a fault current limiter of a saturated high permeability core type having at least one phase wound around a high permeability material, a method of suppressing a time derivative of a transient fault current during a zero current condition, comprising:
- utilizing one of a screen or a shield around the phase coil to suppress a magnitude of di/dt at the zero current condition.

* * * * *